(12) United States Patent
Kumarasamy et al.

(10) Patent No.: US 8,504,869 B2
(45) Date of Patent: Aug. 6, 2013

(54) KERNEL SWAPPING SYSTEMS AND METHODS FOR RECOVERING A NETWORK DEVICE

(75) Inventors: Paramasivam Kumarasamy, Morganville, NJ (US); Amit Mitkar, Neptune, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 399 days.

(21) Appl. No.: 12/895,377

(22) Filed: Sep. 30, 2010

(65) Prior Publication Data
US 2012/0017111 A1 Jan. 19, 2012

Related U.S. Application Data

(60) Provisional application No. 61/365,016, filed on Jul. 16, 2010.

(51) Int. Cl.
*G06F 11/00* (2006.01)
(52) U.S. Cl.
USPC .......................................... 714/4.3; 714/4.21
(58) Field of Classification Search
None
See application file for complete search history.

(56) References Cited

U.S. PATENT DOCUMENTS

| | | | |
|---|---|---|---|
| 4,084,231 A | 4/1978 | Capozzi et al. | |
| 4,267,568 A | 5/1981 | Dechant et al. | |
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |

(Continued)

FOREIGN PATENT DOCUMENTS

| CA | 2498174 | 4/2010 |
|---|---|---|
| EP | 0259912 | 3/1988 |

(Continued)

OTHER PUBLICATIONS

Luis-Felipe Cabrera, et al. "ADSM: A Multi-Platform, Scalable, Backup and Archive Mass Storage System", Digest of Papers of the Computer Society Computer Conference (Spring) Compeon, US, Los Alamitos, IEEE Comp. Soc. Press, vol. Conf. (Mar. 5, 1995), pp. 420-427.

(Continued)

*Primary Examiner* — Christopher McCarthy
(74) *Attorney, Agent, or Firm* — Knobbe Martens Olson & Bear LLP

(57) ABSTRACT

In certain embodiments, a method is disclosed for recovering a failed client device in a network. The method includes booting a failed one of a plurality of client devices in the network with a generic image having a generic kernel usable with each of the plurality of client devices. The method further includes downloading, using said generic kernel, from at least one backup server an abbreviated kernel uniquely associated with the failed client device, the abbreviated kernel comprising substantially less data than an original kernel of the failed client device immediately prior to failure of the failed client device, the abbreviated kernel comprising a boot kernel image and at least one device driver. The method includes swapping the abbreviated kernel with the generic kernel; restoring, using said abbreviated kernel, remaining backup data from the at least one backup server to the failed client device; and rebooting the failed client device.

17 Claims, 3 Drawing Sheets

U.S. PATENT DOCUMENTS

| | | | |
|---|---|---|---|
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,301,286 | A | 4/1994 | Rajani |
| 5,321,816 | A | 6/1994 | Rogan et al. |
| 5,347,653 | A | 9/1994 | Flynn et al. |
| 5,410,700 | A | 4/1995 | Fecteau et al. |
| 5,420,996 | A | 5/1995 | Aoyagi |
| 5,454,099 | A | 9/1995 | Myers et al. |
| 5,559,991 | A | 9/1996 | Kanfi |
| 5,642,496 | A | 6/1997 | Kanfi |
| 6,418,478 | B1 | 7/2002 | Ignatius et al. |
| 6,542,972 | B2 | 4/2003 | Ignatius et al. |
| 6,658,436 | B2 | 12/2003 | Oshinsky et al. |
| 6,721,767 | B2 | 4/2004 | De Meno et al. |
| 6,760,723 | B2 | 7/2004 | Oshinsky et al. |
| 7,003,641 | B2 | 2/2006 | Prahlad et al. |
| 7,035,880 | B1 | 4/2006 | Crescenti et al. |
| 7,130,970 | B2 | 10/2006 | Devassy et al. |
| 7,162,496 | B2 | 1/2007 | Amarendran et al. |
| 7,174,433 | B2 | 2/2007 | Kottomtharayil et al. |
| 7,209,972 | B1 | 4/2007 | Ignatius et al. |
| 7,246,207 | B2 | 7/2007 | Kottomtharayil et al. |
| 7,315,923 | B2 | 1/2008 | Retnamma et al. |
| 7,315,924 | B2 | 1/2008 | Prahlad et al. |
| 7,380,072 | B2 | 5/2008 | Kottomtharayil et al. |
| 7,389,311 | B1 | 6/2008 | Crescenti et al. |
| 7,395,282 | B1 | 7/2008 | Crescenti et al. |
| 7,401,154 | B2 | 7/2008 | Ignatius et al. |
| 7,409,509 | B2 | 8/2008 | Devassy et al. |
| 7,440,982 | B2 | 10/2008 | Lu |
| 7,447,692 | B2 | 11/2008 | Oshinsky et al. |
| 7,454,569 | B2 | 11/2008 | Kavuri et al. |
| 7,484,054 | B2 | 1/2009 | Kottomtharayil et al. |
| 7,490,207 | B2 | 2/2009 | Amarendran et al. |
| 7,500,053 | B1 | 3/2009 | Kavuri et al. |
| 7,536,291 | B1 | 5/2009 | Retnamma et al. |
| 7,543,125 | B2 | 6/2009 | Gokhale |
| 7,546,324 | B2 | 6/2009 | Prahlad et al. |
| 7,581,077 | B2 | 8/2009 | Ignatius et al. |
| 7,603,386 | B2 | 10/2009 | Amarendran et al. |
| 7,606,844 | B2 | 10/2009 | Kottomtharayil |
| 7,613,748 | B2 | 11/2009 | Brockway et al. |
| 7,613,752 | B2 | 11/2009 | Prahlad et al. |
| 7,617,253 | B2 | 11/2009 | Prahlad et al. |
| 7,617,262 | B2 | 11/2009 | Prahlad et al. |
| 7,620,710 | B2 | 11/2009 | Kottomtharayil et al. |
| 7,636,743 | B2 | 12/2009 | Erofeev |
| 7,651,593 | B2 | 1/2010 | Prahlad et al. |
| 7,657,550 | B2 | 2/2010 | Prahlad et al. |
| 7,660,807 | B2 | 2/2010 | Prahlad et al. |
| 7,661,028 | B2 | 2/2010 | Erofeev |
| 7,739,459 | B2 | 6/2010 | Kottomtharayil et al. |
| 7,747,579 | B2 | 6/2010 | Prahlad et al. |
| 7,757,043 | B2 | 7/2010 | Kavuri et al. |
| 7,769,961 | B2 | 8/2010 | Kottomtharayil et al. |
| 7,801,864 | B2 | 9/2010 | Prahlad et al. |
| 7,802,067 | B2 | 9/2010 | Prahlad et al. |
| 7,809,914 | B2 | 10/2010 | Kottomtharayil et al. |
| 2006/0156057 | A1* | 7/2006 | Babu ............................. 714/5 |
| 2007/0067679 | A1* | 3/2007 | Deobald ...................... 714/36 |
| 2011/0035618 | A1* | 2/2011 | Jann et al. .................... 714/3 |
| 2012/0042195 | A1* | 2/2012 | Marinelli et al. ............. 714/3 |
| 2012/0054475 | A1* | 3/2012 | Lee .............................. 713/1 |

FOREIGN PATENT DOCUMENTS

| | | |
|---|---|---|
| EP | 0405926 | 1/1991 |
| EP | 0467546 | 1/1992 |
| EP | 0645709 | 9/1994 |
| EP | 0774715 | 5/1997 |
| EP | 0809184 | 11/1997 |
| EP | 541281 | 4/1998 |
| EP | 0899662 | 3/1999 |
| EP | 0981090 | 2/2000 |
| EP | 1204922 | 7/2000 |
| EP | 1393181 | 1/2001 |
| EP | 1384135 | 7/2010 |
| GB | 2410106 | 9/2006 |
| GB | 2409553 | 4/2007 |
| GB | 2425199 | 8/2007 |
| GB | 2435756 | 12/2008 |
| GB | 2447361 | 5/2009 |
| JP | 4198050 | 10/2008 |
| JP | 4267443 | 2/2009 |
| WO | WO 9513580 | 5/1995 |
| WO | WO 9912098 | 3/1999 |

OTHER PUBLICATIONS

Mendel Rosenblum Operating Systems Review (SIGOPS), vol. 25, No. 5, May 1991, New York, US, "The Design and Implementation of a Log-Structured File System", p. 4, paragraph 3.3—p. 5.

IBM Technical Disclosure Bulletin, vol. 24, No. 5, Oct. 1981 New York, US, pp. 2404-2406, K.L. Huff, "Data Set Usage Sequence Number".

David A. Arneson, "Mass Storage Archiving in Network Environments"; IEEE; Oct. 31-Nov. 1988; pp. 45-80.

Eitel, "Backup and Storage Management in Distributed Heterogenerous Environments", IEEE, 1994, pp. 124-126.

* cited by examiner

KERNEL SWAPPING SYSTEMS AND METHODS FOR RECOVERING A NETWORK DEVICE

CROSS-REFERENCE TO RELATED APPLICATION

This application claims the benefit of priority under 35 U.S.C. §119(e) of U.S. Provisional Patent Application No. 61/365,016, filed on Jul. 16, 2010, and entitled "KERNEL SWAPPING SYSTEMS AND METHODS FOR RECOVERING A NETWORK DEVICE," the disclosure of which is hereby incorporated by reference in its entirety.

BACKGROUND

1. Field

The present disclosure relates to data recovery and, in particular, to recovery systems and methods for a computer network having multiple client devices.

2. Description of the Related Art

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

As can be appreciated, serious errors or system failures, such as a hard drive crash or motherboard replacement, can be catastrophic if computer systems and their data is not protected. To protect their data, some administrators create a disc image in a format defined by the International Organization for Standardization (ISO) (hereinafter referred to as an "ISO image") that contains the entire system kernel and device drivers for a specific client computing device having a unique set of hardware and software settings. In the case of a disaster, this ISO image can be loaded, booted and used to recover or rebuild the particular failed system by reinstalling the operating system and device drivers.

Each ISO image, however, is specific to a client device and can represent a rather large image. For instance, in a LINUX environment, such images can be on the order of a gigabyte (GB). Thus, in business enterprises having hundreds or thousands of client devices, the resources needed to store and update the ISO images for all the client devices can be extensive and costly.

SUMMARY

In view of the foregoing, a need exists for improved backup and recovery systems and methods for a computer network environment. For instance, there is a need for a recovery solution that does not require a full ISO image to be generated and stored for each client device on a network to protect such devices and/or data from being lost in an unanticipated failure.

Certain embodiments of the invention are provided for complete system recovery including a generic solution that can be used for any one of a plurality of different network computing devices. For instance, certain inventive solutions utilize a multi-step process for performing complete system recovery. First, a generic image is used to boot a failed client system. Second, an abbreviated or minimum kernel is retrieved from a backup server and swapped for the standard kernel of the generic image. Finally, the minimum kernel is used to obtain the remaining backup data of the client device to complete the system recovery.

In certain embodiments, a method is disclosed for recovering a failed client device in a computer network. The method includes booting a failed one of a plurality of client computing devices in a computer network with a generic image having a generic kernel usable with each of the plurality of client computing devices. The method further includes downloading, using said generic kernel, from at least one backup server an abbreviated kernel uniquely associated with the failed client computing device, the abbreviated kernel comprising substantially less data than an original kernel of the failed client computing device immediately prior to failure of the failed client computing device, the abbreviated kernel comprising a boot kernel image and at least one device driver. The method also comprises swapping the abbreviated kernel with the generic kernel; restoring, using said abbreviated kernel, remaining backup data from the at least one backup server to the failed client computing device; and rebooting the failed client computing device.

In certain embodiments, a data recovery system is disclosed comprising a plurality of client computing devices and at least one backup server in network communication with the plurality of client computing devices. The at least one backup server stores for each of the plurality of client computing devices at least one abbreviated kernel uniquely associated with the corresponding client computing device. Each abbreviated kernel comprises substantially less data than an original kernel of the corresponding client computing device and includes a boot kernel image and at least one device driver. The data recovery system also includes a storage medium comprising a generic image having a standard kernel usable to boot each of the plurality of client computing devices, wherein the generic image enables a failed client computing device of the plurality of client computing devices to: (1) download from the at least one backup server the abbreviated kernel corresponding to the failed client computing device, and (2) swap the downloaded abbreviated kernel with the standard kernel.

A system is disclosed for recovering a failed client device, the system comprises means for booting a failed one of a plurality of client computing devices in a computer network, said means for booting storing a generic image having a generic kernel usable with each of the plurality of client computing devices. The system also includes means for storing at least one abbreviated kernel for each of the plurality of client computing devices, each abbreviated kernel comprising substantially less data than an original kernel of the corresponding client computing device and including a boot kernel image and at least one device driver. The system further includes means for downloading from said storing means a selected one of the plurality of abbreviated kernels that is uniquely associated with the failed client computing device; and means for swapping the selected abbreviated kernel with the generic kernel and restoring remaining backup data from said storing means to the failed client computing device.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages

DETAILED DESCRIPTION OF THE PREFERRED EMBODIMENTS

As will be seen from the disclosure herein, certain embodiments of systems and methods are provided for improving backup and recovery of client devices in a computer network environment. For instance, certain embodiments of the invention include a recovery solution that does not require a full ISO image to be created for each client device on the network to protect such devices and/or data from being lost in an unanticipated failure.

In certain embodiments, a multi-step process is performed to recover a failed client device. First, a generic boot image having a standard kernel usable with multiple client devices is used to boot the failed client system. Next, an abbreviated or minimum kernel specific to the failed client device is obtained from a backup server and swapped with the standard kernel of the generic image. Finally, the minimum kernel is used to obtain the remaining backup data of the client device to perform a complete system recovery.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

Figure 1:
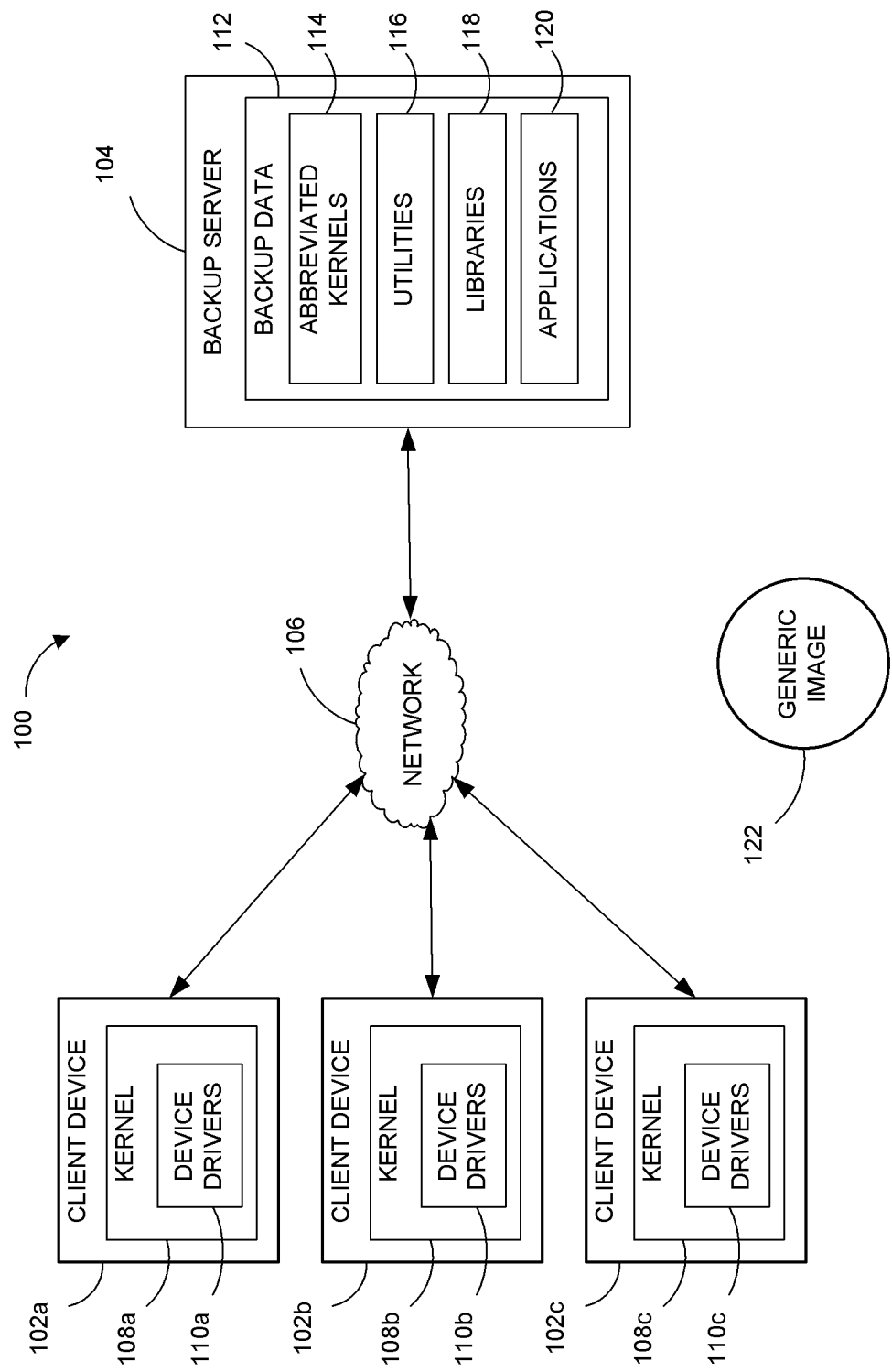
FIG. 1 illustrates a block diagram of a recovery system according to certain embodiments of the invention.

FIG. 1 illustrates a block diagram of a recovery system 100 according to certain embodiments of the invention. In certain embodiments, the system 100 allows for the complete recovery of one or more failed client devices without requiring a customized boot-up disk for each client device. Rather, the system 100 can execute a multi-stage recovery process that utilizes a generic image for all client devices to download an abbreviated or minimum kernel that is swapped for a standard kernel of the generic image. The minimum kernel is then configured to obtain the remainder of the backed up client data (e.g., libraries, utilities, applications) to perform a complete recovery of the failed client system.

As shown, the system 100 comprises a plurality of client devices 102a, 102b and 102c (collectively "102") that communicate with a backup server 104 via a network 106. Each of the client devices 102 comprises a computing device configured to manipulate, generate or otherwise process data. In certain embodiments, the client device 102 comprises a desktop computer. In other embodiments, the client device 102 can comprise a server, a workstation, a virtual machine, a laptop, a notebook, a personal computer, a smartphone, a PDA, combinations of the same or the like.

The backup server 104 comprises one or more destination devices for storing backup data relating to the client devices 102. For instance, in certain embodiments, the backup server 104 comprises and/or communicates with a plurality of storage devices in network communication with each other and coupled to the network 106. In such embodiments, the backup server 104 can comprise one or more storage manager devices and/or storage controller devices that direct the storage and retrieval of backup data. U.S. Pat. No. 7,389,311, issued Jun. 17, 2008, which provides additional details of systems and methods for directing control of backup operations in a network system such as the recovery system 100, is hereby incorporated herein by reference in its entirety to be considered part of this specification.

More particularly, in certain embodiments, the backup server 104 comprises one or more storage devices that include any type of media capable of storing data, such as backup data sent from one or more client devices 102. For example, such storage devices may comprise magnetic storage (such as a disk or a tape drive) or other type of mass storage. In certain embodiments, the backup server can comprise a network attached storage device (NAS) or a storage area network (SAN).

In yet other embodiments, the storage devices may be implemented as one or more storage "volumes" that include physical storage disks defining an overall logical arrangement of storage space. For instance, disks within a particular volume may be organized as one or more groups of redundant array of independent (or inexpensive) disks (RAID). In certain embodiments, either or both of the storage devices may include multiple storage devices of the same or different media.

The illustrated network 106 advantageously comprises any means for communicating data between two or more systems or components. It certain embodiments, the network 106 comprises a computer network. For example, the network 106 may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

As shown, client device 102a further comprises a kernel 108a and device drivers 110a, client device 102b further comprises a kernel 108b and device drivers 110b, and client device 102c further comprises a kernel 108c and device drivers 110c. In certain embodiments of the invention, the kernels 108 of the client devices 102 are associated with a LINUX operating system, and each kernel 108 reflects a customized configuration for the particular client device 102 and its applications, hardware, and other system resources. For example, in certain embodiments, the kernel 108 can reach a size of approximately one GB or more.

Each kernel 108 further comprises device drivers 110 that are associated with the particular client device 102. Such device drivers 110 generally provide means for higher level computer programs executing on the client device 102 to interact with the hardware resources and/or peripheral devices associated with the client device 102.

The backup server 104 provides means for storing data used to recover a failed client device 102. In particular, the backup server 104 comprises backup data 112 for each of the client devices 102. For instance, such backup data 112 can be obtained from the client devices 102 based on a job schedule maintained by the backup server 104 or other management device, or such backups can be performed based on user preferences, on an as-needed basis or the like.

The backup data 112 comprises a plurality of abbreviated kernels 114 that correspond to the kernels 108 of each of the client devices 102. Such abbreviated kernels 114 differ, however, from the complete kernels 108 in that they contain a reduced or minimum amount of data needed to initiate recovery of the associated client system 102.

In certain embodiments, the abbreviated kernel 114 comprises a basic kernel image and select ones of the device drivers 110 needed to recover a failed client system 102. For example, in certain embodiments, the abbreviated kernel 114 comprises a network device driver for initiating communication with the backup server 104 to obtain other backup data 112 of the failed client device 102. The abbreviated kernel may further include, without limitation, device drivers for an Integrated Drive Electronics (IDE) bus, Small Computer Systems Interface (SCSI) interfaces or SCSI-based drives or other peripheral components, Ethernet cards, cluster services, graphical video cards, combinations of the same or the like. In certain embodiments, the abbreviated kernel 114 can be updated with each backup operation of the client device 102 and/or can be modified whenever changes are detected to the kernel 108 of the client system 102.

In certain embodiments, the abbreviated kernel 114 does not comprise other non-critical data, such as libraries, utilities or other applications. For instance, in certain embodiments, the abbreviated kernel 114 does not comprise sufficient information to boot up the client device 102. As such, the abbreviated kernel 114 advantageously comprises a minimum or substantially reduced size in comparison with the associated complete kernel 108. For instance, in certain embodiments, the abbreviated kernel 114 can comprise a size of between approximately 30 megabytes (MB) and approximately 250 MB. As can be appreciated, in certain embodiments, the abbreviated kernel 114 can be less than one-fourth the size of a corresponding full kernel, less than one-tenth the size of the corresponding full kernel, or even less than one-twentieth the size of the corresponding full kernel.

The backup data 112 on the backup server 104 further comprises, for example, utilities 116, libraries 118 and applications 120 of each of the client systems 102. For instance, the utilities 116 can comprise configuration utilities, resource and/or performance management utilities, virus software, network management utilities, volume management utilities, disk management utilities, software configuration management utilities, storage installer utilities, package manager utilities, security configuration manager utilities (e.g., SELinux) combinations of the same or the like. Moreover, libraries 118 can comprise dynamic link libraries (DLLs) and/or statically linked libraries (e.g., .afiles).

The applications 120 may comprise, for example, software applications that interact with a user to process data and may include, for example, database applications (e.g., Oracle, DB2, or Sybase applications), word processors, spreadsheets, financial applications, management applications, e-commerce applications, browsers, combinations of the same or the like. For example, in certain embodiments, the applications 120 may comprise one or more of the following, without limitation: Web servers such as Apache Tomcat, mail clients such as Thunderbird or Evolution, office applications such as Open Office Suite, or other applications such as Lotus Notes.

It will also be understood that the backup data 112 can comprise other information not specifically illustrated in FIG. 1 that is backed up for the client devices 102. For instance, the backup data 112 can comprise configuration information, files, folders, and other information that is backed up from the client devices 102. Moreover, although the different types of data (e.g., utilities 116, libraries 118, applications 120, etc.) are illustrated for exemplary purposes as being grouped together, it will be understood that data from each client device 102 can be stored together in one or more storage locations.

The recovery system 100 further comprises a generic image 122 having a standard boot ISO image usable to boot any of the client devices 102 following a system or device failure. In certain embodiments, the generic image 122 comprises a standard SUSE LINUX image available from Novell, Inc. (Waltham, Mass.) capable of booting any LINUX client. For instance, in certain embodiments, the generic image 122 is stored on an optical disc, such as a compact disc (CD) or digital versatile disc (DVD). In yet other embodiments, the generic image 122 can be stored on other types of bootable media, such as a universal serial bus (USB) flash drive, a memory card, a hard drive or the like.

Because the generic image 122 can be used for any of the client devices 102, the image 122 is generally larger than the abbreviated kernel 114. For instance, the generic image 122 can be of a size on the order of one GB. The generic image 122 can comprise, for example, a generic SUSE Linux image, comprising device drivers for displays, keyboards, mice, network cards, storage devices, or combinations of the same and the like. The generic image 122 may also comprise software configured to assist in the retrieval of the backed up kernel during a recovery process, for example. However, due to the substantially constant nature of the generic image 122, such an image can be provided once during the lifetime of the client device 102, in certain embodiments.

As discussed in more detail below, the generic image 122 comprises enough information to enable a failed client device 102 to boot up and download from the backup server 104 the abbreviated kernel 114 that corresponds to the failed client device 102. For instance, the generic image 122 can be used to detect the client device's hard drive in order to store data and to initialize an Ethernet or other network communication in order to go online. Once the abbreviated kernel 114 is obtained, the abbreviated kernel 114 is swapped for the standard kernel associated with the generic image 122.

Figure 2:
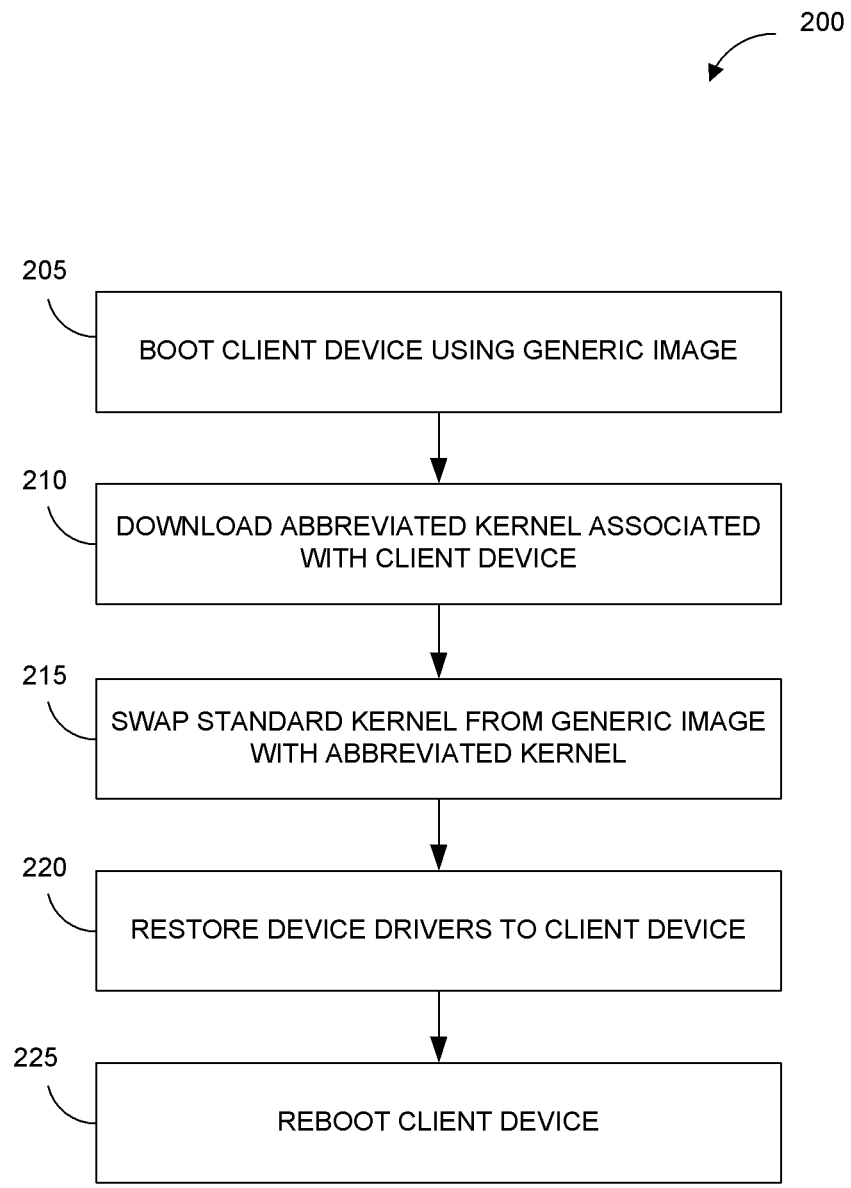
FIG. 2 illustrates a flow chart of an exemplary embodiment of a recovery process usable by the recovery system of FIG. 1.

FIG. 2 illustrates a flow chart of an exemplary embodiment of a recovery process 200 for a failed client device in a network system. The process 200 advantageously performs recovery of the failed client device without requiring the entire kernel of the client device to be backed up beforehand. For exemplary purposes, the recovery process 200 will be described herein with reference to the components of the recovery system 100 of FIG. 1.

The process 200 begins after a failure of a client device 102 has been detected. For instance, a user or system administrator can determine that the client device 102 has experienced a failure or other loss of data. At Block 205, the client device 102 is booted up using the generic image 122. In certain embodiments, the user or system administrator loads the optical disc containing the generic image 122 and boots the client device 102. During this step, the client device 102 executes under the direction of the standard kernel associated with the generic image 122. In certain embodiments, booting from the generic image 122 at least enables detection and recognition of the client device's hard drive for storage of data and initiates an Ethernet or other network connection to establish communication with the backup server 104.

At Block 210, the client device 102 downloads from the backup server 104 the abbreviated kernel 114 for the particular client device 102. In certain embodiments, the user or other individual enters the name or other identification of the client device 102 that is being recovered in order to download the appropriate abbreviated kernel 114. In yet other embodiments, the appropriate abbreviated kernel 114 is automatically downloaded based on information provided by the client device 102, such as an internet protocol (IP) address, a media access control (MAC) address or the like.

Once the abbreviated kernel 114 is downloaded, the kernel 114 is swapped with the standard kernel of the generic image 122 (Block 215). In certain embodiments, the client device 102 executes a "kexec.exe" command to perform the swap. In certain embodiments, the change in the kernel execution from the standard kernel to the abbreviated kernel 114 represents a total kernel swap, which can include kernel address space and/or device drivers.

Once the client device 102 is executing under the control of the abbreviated kernel 114, the remaining device drivers, utilities 116, libraries 118 and applications 120 are downloaded from the client system (Block 220). At Block 225, the recovery process 200 ends with the rebooting of the client device 102.

Figure 3:
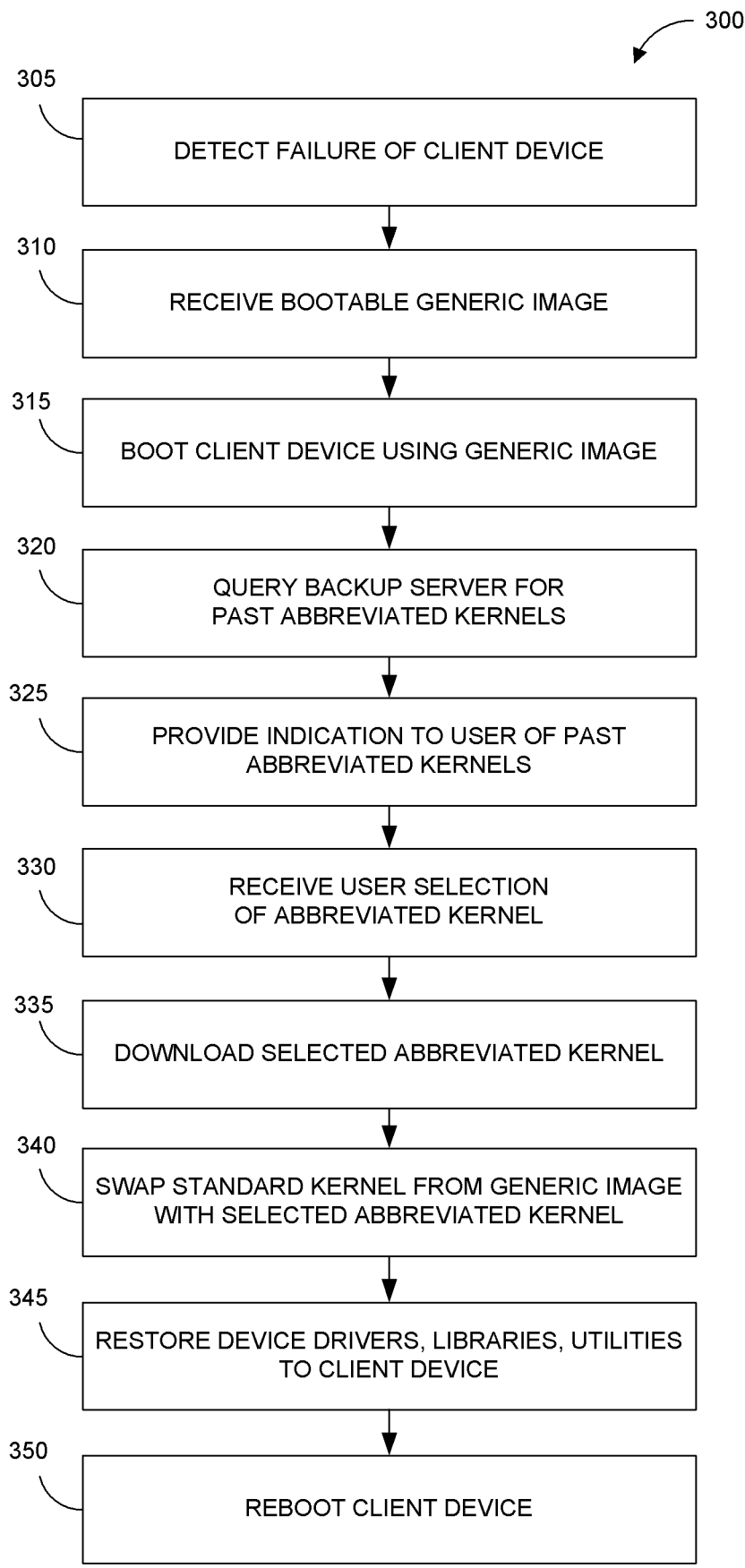
FIG. 3 illustrates a flow chart of another embodiment of a recovery process usable by the recovery system of FIG. 1.

FIG. 3 illustrates a flow chart of another embodiment of a recovery process 300 usable by the recovery system 100 of FIG. 1. Like the process 200, the recovery process 300 advantageously performs recovery of the client device without requiring the entire kernel of the client device to be backed up beforehand. For exemplary purposes, the recovery process 300 will be described herein with reference to the components of the recovery system 100 of FIG. 1. Moreover, steps or acts of the process 300 that have been described with respect to the process 200 of FIG. 2 will not necessarily be re-described in detail.

The process 300 begins at Block 305 by detecting a failure or malfunction of at least one of a plurality of client devices 102 on a network system. For example, in certain embodiments, the detection comprises an automatic detection by a network device, such as a storage management module. In yet other embodiments, a user or system administrator can determine that the client device 102 has experienced a failure or other loss of data.

At Block 310, the process 300 receives the bootable generic image 122. In certain embodiments, the generic image 122 is stored on an optical disc and can be used with multiple ones of the plurality of client devices 102. In yet other embodiments, the generic image 122 is maintained on other memory, such as a bootable USB drive or the like. At Block 315, the client device 102 is booted up using the generic image 122, which includes a standard kernel that enables detection and recognition of the client device's hard drive for storage of data, initiates an Ethernet or other network connection to establish communication with the backup server 104 and/or enables communication through one or more user interface devices.

Once the network connection is established, the client device 102 queries the backup server 104 for a listing of abbreviated kernels 114 stored on the backup server 104 that are associated with the client device 102. For instance, the backup server 104 may comprise a plurality of abbreviated kernels 114 associated with past backups of the client device 102. In certain embodiments, the query process is initiated by the user entering a client device name, IP address or other unique identification information.

At Block 325, the backup server 104 provides an indication of the stored abbreviated kernels 114. In certain embodiments, the client device 102 displays the indication to the user via a user interface for selection of a particular abbreviated kernel 114 by the user. At Block 330, the user selects the abbreviated kernel 114 to be downloaded from the backup server 104. In certain embodiments, the selection is made via a graphical user interface, such as via a drop down list, a selection window or the like. In certain embodiments, the most recently-backed up abbreviated kernel 114 is designated as the default abbreviated kernel absent selection by the user of another abbreviated kernel. For instance, in certain embodiments, the default abbreviated kernel can be automatically downloaded absent user instructions to the contrary.

Once the selected abbreviated kernel 114 is downloaded from the backup server 104 to the client device 102 (Block 335), the abbreviated kernel 114 is swapped with the standard kernel of the generic image 122, as discussed above (Block 340). At Block 345, under the operation of the downloaded abbreviated kernel 114, the remaining device drivers, utilities, libraries and other data are downloaded from the backup server 104 to the client device 102 to enable a complete system recovery as of the time of the most recent backup. At Block 350, the process 300 is finalized with a reboot of the client device 102.

In certain embodiments of the invention, data backup systems and methods may be used in a modular storage management system, embodiments of which are described in more detail in U.S. Pat. No. 7,035,880, issued Apr. 5, 2006, which is hereby incorporated herein by reference in its entirety. For example, the data recovery system may be part of a storage operation cell that includes combinations of hardware and software components directed to performing storage operations on electronic data. Exemplary storage operation cells usable with embodiments of the invention include Comm-Cells as embodied in the QNET storage management system and the QINETIX storage management system by CommVault Systems, Inc. (Oceanport, N.J.), and as further described in U.S. Pat. No. 7,454,569, issued Nov. 18, 2008, which is hereby incorporated herein by reference in its entirety. In yet other embodiments, the data backup is performed according to one or more migration and/or information lifecycle management (ILM) policies.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flow chart illustrations and/or block diagrams of methods, apparatus (systems) and computer program products. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for recovering a failed client device in a computer network, the method comprising:
    booting a failed one of a plurality of client computing devices in a computer network with a generic image having a generic kernel usable with each of the plurality of client computing devices;
    downloading, using said generic kernel, from at least one backup server an abbreviated kernel uniquely associated with the failed client computing device, the abbreviated kernel comprising substantially less data than an original kernel of the failed client computing device immediately prior to failure of the failed client computing device, the abbreviated kernel comprising a boot kernel image and at least one device driver;
    swapping the abbreviated kernel with the generic kernel;
    restoring, using said abbreviated kernel, remaining backup data from the at least one backup server to the failed client computing device; and
    rebooting the failed client computing device.

2. The method of claim 1, wherein said abbreviated kernel comprises a size between approximately thirty and approximately 250 megabytes (MB).

3. The method of claim 1, wherein said abbreviated kernel comprises a size less than ten percent the size of said original kernel.

4. The method of claim 3, wherein said abbreviated kernel comprises a size less than five percent the size of said original kernel.

5. The method of claim 1, wherein said abbreviated kernel does not comprise utilities.

6. The method of claim 5, wherein said abbreviated kernel does not comprise libraries.

7. The method of claim 1, wherein said abbreviated kernel comprises a non-bootable image.

8. The method of claim 1, additionally comprising, prior to said downloading, receiving a user selection of the abbreviated kernel from a plurality of abbreviated kernels uniquely associated with the failed client computing device.

9. The method of claim 8, additionally comprising providing via a user interface a graphical indication of the plurality of abbreviated kernels uniquely associated with the failed client computing device.

10. A data recovery system comprising:
    a plurality of client computing devices;
    at least one backup server in network communication with the plurality of client computing devices, the at least one backup server storing for each of the plurality of client computing devices at least one abbreviated kernel uniquely associated with the corresponding client computing device, each abbreviated kernel comprising substantially less data than an original kernel of the corresponding client computing device and including a boot kernel image and at least one device driver; and
    a storage medium comprising a generic image having a standard kernel usable to boot each of the plurality of client computing devices, wherein the generic image enables a failed client computing device of the plurality of client computing devices to,
        download from the at least one backup server the abbreviated kernel corresponding to the failed client computing device, and
        swap the downloaded abbreviated kernel with the standard kernel.

11. The data recovery system of claim 10, wherein the downloaded abbreviated kernel is configured to instruct the failed client computing device to restore remaining backup data from the at least one backup server to the failed client computing device.

12. The data recovery system of claim 10, wherein the downloaded abbreviated kernel comprises a size between approximately thirty and approximately 250 megabytes (MB).

13. The data recovery system of claim 10, wherein the downloaded abbreviated kernel comprises a size less than ten percent the size of the original kernel associated with the failed client computing device.

14. The data recovery system of claim 13, wherein the downloaded abbreviated kernel comprises a size less than five percent the size of the original kernel associated with the failed client computing device.

15. The data recovery system of claim 10, wherein the downloaded abbreviated kernel is associated with a LINUX operating system.

16. The data recovery system of claim 15, wherein the generic image is at least ten times the size of the downloaded abbreviated kernel.

17. A system for recovering a failed client device, the system comprising:
    means for booting a failed one of a plurality of client computing devices in a computer network, said means for booting storing a generic image having a generic kernel usable with each of the plurality of client computing devices;
    means for storing at least one abbreviated kernel for each of the plurality of client computing devices, each abbreviated kernel comprising substantially less data than an original kernel of the corresponding client computing device and including a boot kernel image and at least one device driver;
    means for downloading from said storing means a selected one of the plurality of abbreviated kernels that is uniquely associated with the failed client computing device; and means for swapping the selected abbreviated kernel with the generic kernel and restoring remaining backup data from said storing means to the failed client computing device.

* * * * *